A. Amory.
Guide-Attachment for Boring-Instruments.
No. 92,927. Patented July 27, 1869.

Witnesses

Inventor

United States Patent Office.

ARTHUR AMORY, OF NEW YORK, N. Y.

Letters Patent No. 92,927, dated July 27, 1869.

IMPROVEMENT IN GUIDE-ATTACHMENT FOR BORING-INSTRUMENTS.

The Schedule referred to in these Letters Patent and making part of the same.

To all whom it may concern:

Be it known that I, ARTHUR AMORY, of the city, county, and State of New York, have invented a new and improved Guide-Attachment for Boring-Instruments; and I do hereby declare that the following is a full, clear, and exact description thereof, which will enable others skilled in the art to make and use the same, reference being had to the accompanying drawings, forming part of this specification.

This invention relates to improvements in apparatus for indicating the position of boring-instruments, to assist the operator to guide them properly for boring vertically or angularly, as required.

The invention consists in supporting a pair of spirit-levels upon the shank of the boring-instrument, by a clamp which may be readily attached or detached, the levels being so adjusted as to indicate the position of the boring-stock longitudinally, vertically, or obliquely, all as hereinafter more fully specified.

Figure 1:
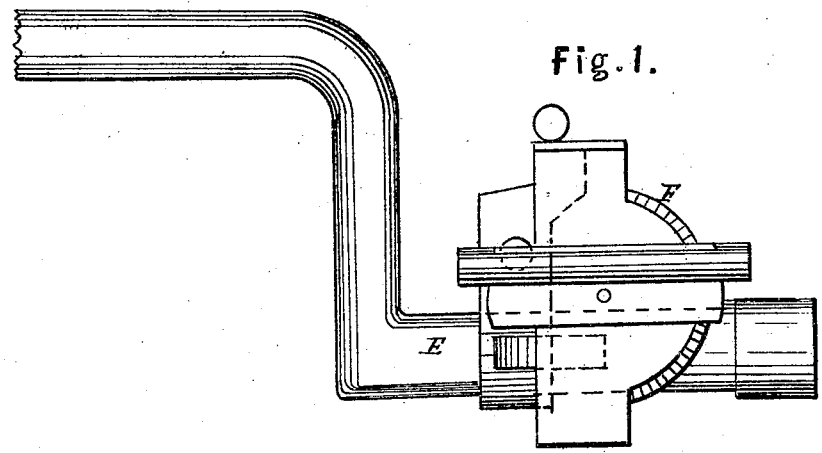
Figure 2:
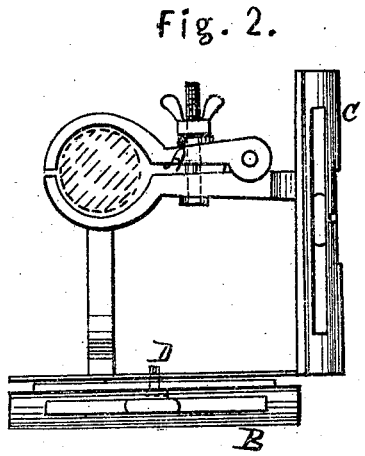

Figure 1 represents a side elevation of my improved attachment, as applied to a tool when boring horizontally, and Figure 2 represents a plan view, as when boring vertically.

Similar letters of reference indicate corresponding parts.

A represents a pair of clamping-jaws and screw, adapted to be clamped to the shank of a boring-instrument, or the stock thereof, to which I connect, in any suitable manner, two spirit or other levels, B C, in planes perpendicular to each other, and in a manner to occupy horizontal positions when boring vertically, whereby the vertical position for the tool may be readily determined, as will be readily understood by inspection of the drawings.

For guiding the tool, when boring horizontally, or at any angle between the horizontal and vertical positions, I suspend one level, B, on a pivot, D, so that it may be turned into a parallel or any angular position relatively to the shank E of the stock or boring-bit, as represented in fig. 1; and for indicating the degree of the angle, I provide an indicator, or scale, F, on a plate, around which the said level turns, marked in degrees of a circle or other preferred characters.

Having thus described my invention,

What I claim, and desire to secure by Letters Patent, is—

The guide-attachment for boring-instruments, consisting of the adjustable clamp A, constructed as described, the spirit-levels B C, one of which is pivoted, and the scale F, all arranged with reference to each other and the clamp, and adapted for attachment to the shank of a boring-tool, in the manner described, for the purpose specified.

The above specification of my invention signed by me, this 22d day of March, 1869.

ARTHUR AMORY.

Witnesses:
   FRANK BLOCKLEY,
   ALEX. F. ROBERTS.